Sept. 29, 1953 P. W. BENJAMIN 2,653,845
COUNTERBALANCE FOR TAIL GATES
Filed Oct. 26, 1951 2 Sheets-Sheet 1
Fig. 1
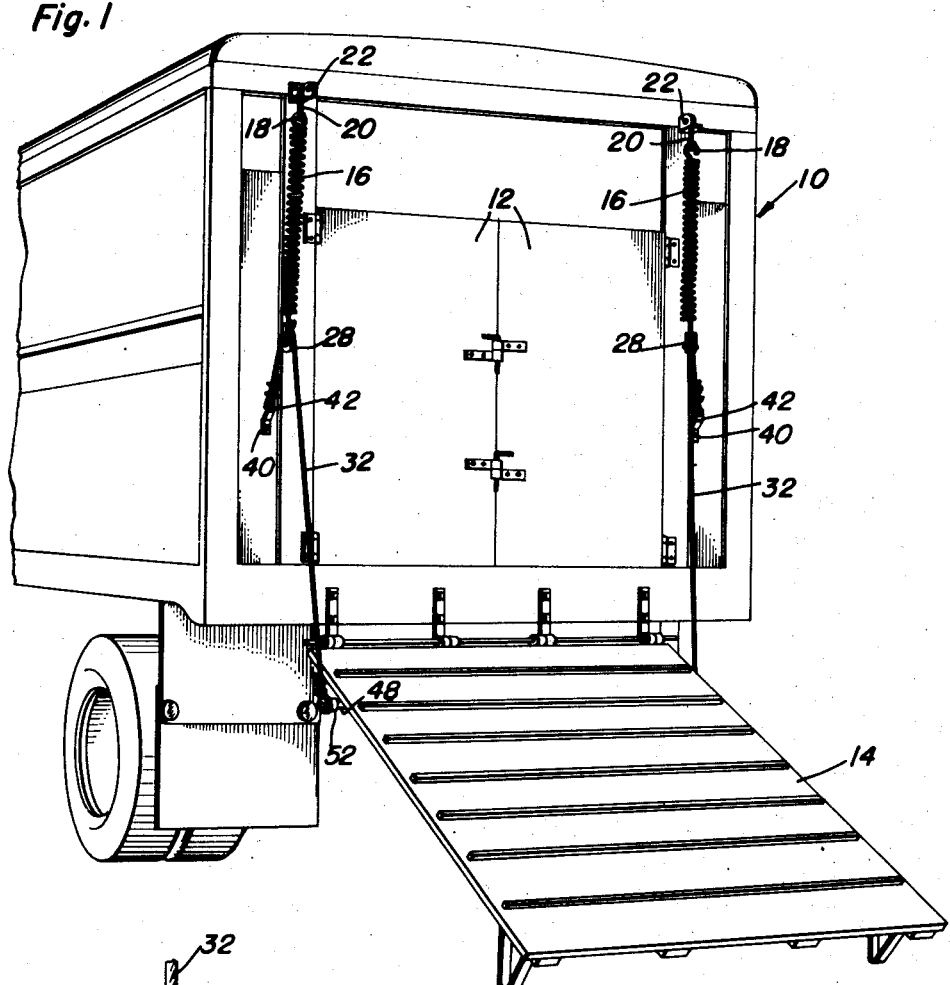
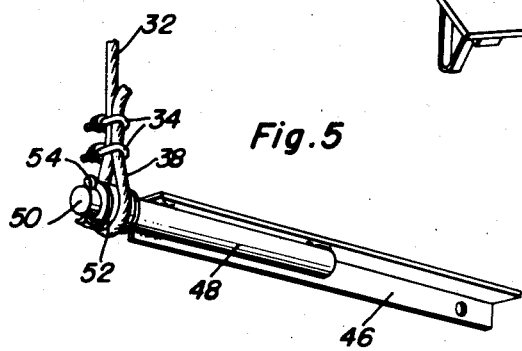
Fig. 5
Percy W. Benjamin
INVENTOR.
BY
*Attorneys*

Sept. 29, 1953 P. W. BENJAMIN 2,653,845
COUNTERBALANCE FOR TAIL GATES
Filed Oct. 26, 1951 2 Sheets-Sheet 2
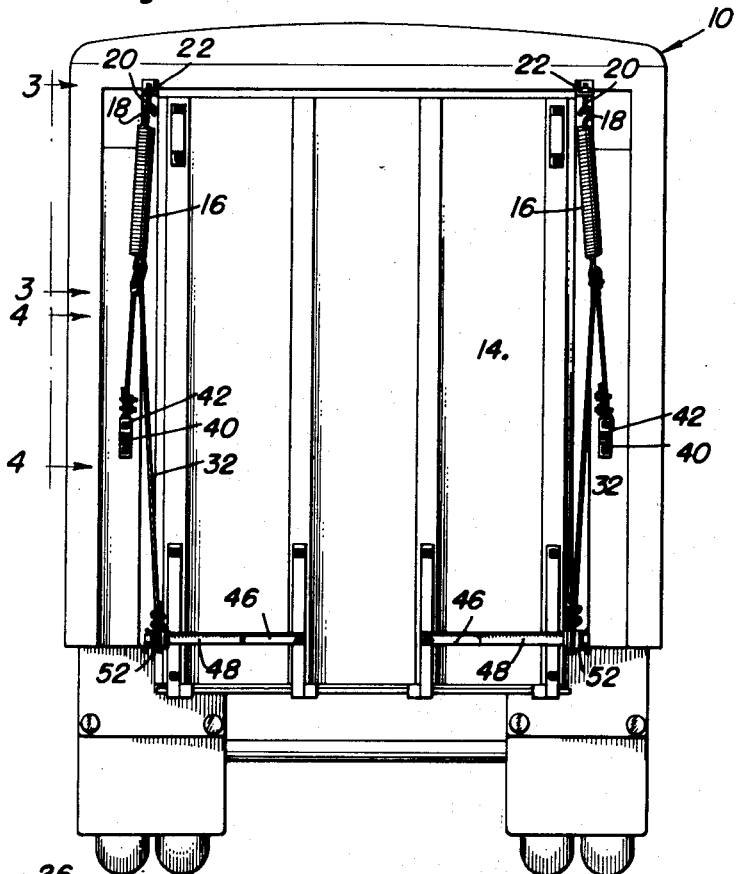
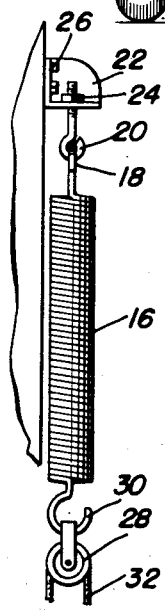
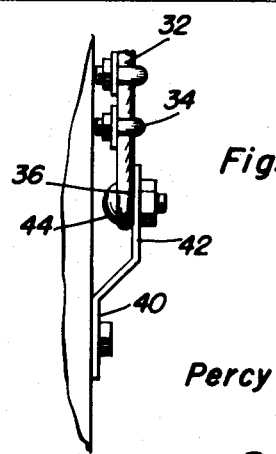
Percy W. Benjamin
INVENTOR.

Patented Sept. 29, 1953

2,653,845

UNITED STATES PATENT OFFICE 2,653,845

COUNTERBALANCE FOR TAIL GATES

Percy W. Benjamin, West Edmeston, N. Y.

Application October 26, 1951, Serial No. 253,407

4 Claims. (Cl. 296—61)

This invention relates to new and useful improvements in ramp forming tail gates for trucks and the primary object of the present invention is to provide a counterbalancing means for the tail gates of animal hauling trucks, whereby the tail gates may be raised in a convenient manner.

Another important object of the present invention is to provide a counterbalance for tail gates that is quickly and readily applied to or removed from a tail gate and the rear of a truck, and which counterbalance is adjustable in accordance with the weight of the tail gate or weakening of the springs forming part of the counterbalance.

A further object of the present invention is to provide a counterbalancing attachment for the ramp forming tail gates of animal hauling vans that is extremely simple and practical in construction.

A still further aim of the present invention is to provide a device of the aforementioned character that is strong and reliable in use, efficient and durable in operation, inexpensive to manufacture, install and service, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 1 is a fragmentary perspective view of a hauling van or truck and showing its tail gate lowered and with the present invention mounted on the truck and the tail gate;

Figure 2 is a rear view of Figure 1 but showing the tail gate raised;

Figure 3 is an enlarged side elevational view taken substantially on the plane of section line 3—3 of Figure 2;

Figure 4 is an enlarged side elevational view taken substantially on the plane of section line 4—4 of Figure 1, and Figure 5 is a fragmentary perspective view showing the means employed for anchoring the flexible elements to the tail gate.

Referring now to the drawings in detail, wherein for the purpose of illustration, there is disclosed a preferred embodiment of the present invention, the numeral 10 represents a hauling van or truck for animals or the like including the usual rear doors 12 and a vertically swingable tail gate 14 which when lowered, as shown in Figure 1, forms a ramp, whereby animals may enter the rear end of the van.

The tail gate 14 is relatively heavy and therefore, it requires considerable effort on the part of an operator for the gate to be raised to its vertical inoperative position. The present invention is so applied to the tail gate and truck, as to permit the tail gate to be raised in a convenient manner.

To accomplish the desired results there is provided a counterbalancing means consisting of a pair of coil springs 16 that are disposed alongside of the tail gate 14 at the rear of the truck 10. The upper hook ends 18 of the coil springs 16 engage eye fasteners 20 whose shanks extend upwardly through angle brackets 22 and which receivably engage nuts 24. The brackets 22 are removably secured to the rear end of the truck by fasteners 26.

Pulleys 28 are supported on the lower hook ends 30 of the coil springs 16 and flexible elements 32 are trained over the pulleys. The ends of the cables or elements 32 are secured to themselves through the medium of U-clamps 34 to form upper and lower loops 36 and 38.

Attaching brackets 40 are secured to the rear end of the truck below the brackets 22 and include offset upper ear portions 42 carrying fasteners 44 about which the loops 36 are engaged.

A pair of coaxial horizontal angle iron members 46 are removably secured to the rear or undersurface of the tail gate 14. The inner ends of shafts 48 are welded against both flanges of the members 46 and include outer ends 50 that project laterally from opposite sides of the tail gate to rotatably support rollers 52, about which the loops 38 are engaged. Cotter pins 54 extend through transverse apertures in the ends 50 and retain rollers 52 on ends 50.

In practical use of the present invention, as the tail gate 14 is swung to its lowered position to form a ramp as shown in Figure 1, the springs 16 will expand so that these springs will aid the raising of the tail gate. The nuts 24 may be manually adjusted on the fasteners 20 to compensate for a reduction in the original resiliency of the springs or to permit the counterbalance to be employed with tail gates of various weights.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In a truck including a vertically swingable tail gate at its rear end that may be lowered to form a ramp, whereby cattle may move into the rear of the truck, a counterbalance for the tail gate comprising a pair of vertical hanger spring members attached at their upper ends to the rear of the truck alongside of said tail gate, pulleys supported on the lower ends of said spring members, and flexible elements trained over the pulleys and having their ends attached to said truck and said tail gate.

2. In a truck including a vertically swingable tail gate at its rear end that may be lowered to form a ramp, whereby cattle may move into the rear of the truck, a counterbalance for the tail gate comprising a pair of spring members attached at their upper ends to the rear of the truck alongside of said tail gate, pulleys supported on the lower ends of said spring members, flexible elements trained over said pulleys, said flexible elements including upper and lower ends, brackets securing the upper ends of said flexible elements to said truck, and anti-friction means securing the lower ends of said flexible elements to said tail gate.

3. In a truck including a vertically swingable tail gate at its rear end that may be lowered to form a ramp, whereby cattle may move into the rear of the truck, a counterbalance for the tail gate comprising a pair of spring members attached at their upper ends to the rear of the truck alongside of said tail gate, pulleys supported on the lower ends of said spring members, flexible elements trained over said pulleys, said flexible elements including upper and lower ends, brackets securing the upper ends of said flexible elements to said truck, a pair of coaxial shafts removably secured to said tail gate, rollers rotatably supported on said shafts, and loops formed at the lower ends of said flexible elements engaged about said rollers.

4. In a truck including a vertically swingable ramp forming tail gate at the rear thereof, means aiding the raising of the tail gate from its lowered position, said means comprising a pair of coil springs having upper and lower ends, brackets securing the upper ends of said coil springs to the rear of the truck alongside of said tail gate, pulleys supported on the lower ends of said coil springs, flexible elements trained over the pulleys and including upper and lower ends, additional brackets securing the upper ends of said flexible elements to the rear of the truck, a pair of coaxial angle iron anchoring members fixed to said tail gate, a shaft secured to each angle iron member and having an outer end projecting outwardly beyond the tail gate, a roller rotatably supported on the outer end of each shaft, and loops formed at the lower ends of said flexible elements engaged about said rollers.

PERCY W. BENJAMIN.

References Cited in the file of this patent

UNITED STATES PATENTS

| Number | Name | Date |
|---|---|---|
| 2,023,909 | Wread | Dec. 10, 1935 |
| 2,573,962 | Fox | Nov. 6, 1951 |

FOREIGN PATENTS

| Number | Country | Date |
|---|---|---|
| 309,693 | Great Britain | Apr. 18, 1929 |
| 510,464 | Great Britain | Aug. 2, 1939 |